(12) United States Patent
Ouyang et al.

(10) Patent No.: US 10,921,658 B2
(45) Date of Patent: Feb. 16, 2021

(54) ARRAY SUBSTRATE AND DISPLAY PANEL

(71) Applicant: Shenzhen China Star Optoelectronics Technology Co., Ltd., Shenzhen (CN)

(72) Inventors: Xing Ouyang, Shenzhen (CN); Jianlan Fang, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 16/603,592

(22) PCT Filed: Jun. 6, 2019

(86) PCT No.: PCT/CN2019/090419
§ 371 (c)(1),
(2) Date: Oct. 8, 2019

(87) PCT Pub. No.: WO2020/220431
PCT Pub. Date: Nov. 5, 2020

(65) Prior Publication Data
US 2020/0348552 A1    Nov. 5, 2020

(51) Int. Cl.
*G02F 1/1345* (2006.01)
*G02F 1/1343* (2006.01)
*G02F 1/1362* (2006.01)

(52) U.S. Cl.
CPC ........ *G02F 1/13452* (2013.01); *G02F 1/1343* (2013.01); *G02F 1/136286* (2013.01); *G02F 2201/121* (2013.01)

(58) Field of Classification Search
CPC ............. G02F 1/1343; G02F 1/134309; G02F 1/1345; G02F 1/1368; G02F 1/13454; G02F 1/13452; G02F 1/136286; G02F 2201/121
See application file for complete search history.

(56) References Cited

U.S. PATENT DOCUMENTS

| | | | |
|---|---|---|---|
| 6,879,353 B2* | 4/2005 | Moon | G02F 1/1345 349/139 |
| 2014/0043552 A1* | 2/2014 | Chang | G02F 1/136286 349/43 |
| 2016/0070130 A1* | 3/2016 | Yuminami | G02F 1/13452 349/110 |
| 2019/0182948 A1* | 6/2019 | Kim | H01L 25/18 |

* cited by examiner

*Primary Examiner* — Thoi V Duong

(57) ABSTRACT

An array substrate and a display panel includes an effective display region and a peripheral lead region; at least two sets of fan-shaped leads are formed on the peripheral lead region and are juxtaposably disposed and spaced apart along a first direction, a common electrode is between the adjacent two sets of the fan-shaped leads, and a plurality of connection lines extend from an edge of the effective display region; the common electrode includes a lateral section; a distance between the lateral section and the effective display region is greater than 500 μm; the connection line and the common electrode constitute into a plurality of diversion lines extending along the second direction on a section between the lateral section and the effective display region.

18 Claims, 3 Drawing Sheets

ARRAY SUBSTRATE AND DISPLAY PANEL

RELATED APPLICATIONS

This application is a National Phase of PCT Patent Application No. PCT/CN2019/090419 having International filing date of Jun. 6, 2019, which claims the benefit of priority of Chinese Patent Application No. 201910364476.6 filed on Apr. 30, 2019. The contents of the above applications are all incorporated by reference as if fully set forth herein in their entirety.

FIELD AND BACKGROUND OF THE INVENTION

The present disclosure relates to a display manufacturing field, and particular to an array substrate and a display panel.

BACKGROUND OF INVENTION

A liquid crystal display (LCD) has advantages, such as thin body, power saving, no radiation, etc., and has been widely used. Most of the liquid crystal display devices on the market are backlight type liquid crystal display devices, which include liquid crystal displays panel and backlight modules. The working principle of a liquid crystal display panel is to place liquid crystal molecules in two parallel glass substrates, and control the liquid crystal molecules to change direction by applying electricity or not on the glass substrate, and refract light of a backlight module to form an image.

Generally, a liquid crystal display panel is made by a color filter (CF) substrate, a thin film transistor (TFT) array substrate, a liquid crystal (LC) sandwiched between the color filter substrate and the TFT array substrate, and a sealant frame (sealant). Generally, the TFT array substrate and the color film substrate respectively have an alignment film, and after the alignment film contacts with the LC, the LC can generate a pretilt angle in a certain direction, thereby providing an angle for carrying the liquid crystal molecules. The pretilt angle has an important influence on the driving voltage, contrast, response time, viewing angle, etc. of the TFT-LCD. The material of the alignment film is usually made of polyimide (PI) material, which is formed by coating PI liquid on the substrate.

In the liquid crystal display panel, the array substrate includes a display area and a non-display area, and crisscrossing gate lines and data lines are disposed in the display area for controlling each of the pixels to realize image display, and a driving chip and fan-out leads connected to the driving chip are disposed in the non-display area. A gate driving signal and a data signal are sent from a control chip in the liquid crystal display, and the gate driving signal and the data signal are generally respectively transmitted to the gate lines and the data lines on the substrate by using a chip on film (COF). Each of the fan-out leads provides a display signal for the display area. In order to reduce the non-display area and increase the display area, each of the fan-out leads is generally designed to be directed toward the driving chip and concentrated to form a fan-out area (Fan-out).

Specifically, as illustrated in FIG. 1, one COF 900 is connected to the gate lines or the data lines of the display area 100 (active area) through one set of the fan-out leads 300 on the substrate. Between two sets of the fan-out leads 300 located in the non-display area 200 on a side of the display area 100, a V-shaped region is formed. Therefore, a current method generally sets a common electrode 400 in the V-shaped region along the edge of the two sets of fan-out leads 300 to be V-shaped, thereby, during coating the PI liquid, the V-shaped common electrode 400 will block the PI liquid diffusing in a certain extent, so that the PI liquid cannot normally diffuse outward at this location, resulting in a film thickness at this location is thicker than other locations, and at the location on the display where the two COFs 900 intersect, a dark display abnormality occurs, which makes the display have uneven display issues (mura).

SUMMARY OF THE INVENTION

The purpose of the present disclosure is to provide an array substrate, which can successfully diffuse PI liquid by changing the route design of the peripheral lead region, thereby homogenizing the PI film thickness and avoiding the surrounding uneven display phenomenon (mura) caused by uneven diffusion of the PI liquid to improve quality of the display panel.

Another purpose of the present disclosure is to provide a display panel, which applies the array substrate mentioned above, and the peripheral mura phenomenon caused by the uneven diffusion of the PI liquid can be avoided to improve quality of the display panel.

In order to realize purpose mentioned above, the present disclosure provides an array substrate, which includes an effective display region and a peripheral lead region located on a side of the effective display region; at least two sets of fan-shaped leads are formed on the peripheral lead region and are juxtaposably disposed and spaced apart along a first direction, a common electrode is between the adjacent two sets of the fan-shaped leads, and a plurality of connection lines extend from an edge of the effective display region to a second direction perpendicular to the first direction; the common electrode includes a lateral section extending along the first direction; the connection line and the common electrode constitute into a plurality of diversion lines extending along the second direction on a section between the lateral section and the effective display region; and a distance between the lateral section and the effective display region is greater than 500 μm.

Further, the lateral section is a section of the common electrode closest to the effective display region; the diversion lines are the connection lines between the lateral section and the effective display region.

Further, a distance between two closet sub-leads respectively located in the adjacent two sets of the fan-shaped leads on an end of the effective display region is greater than a distance between the two connection lines which the two sub-leads corresponding to.

Further, the transverse lines are disposed between the connection lines and the sub-leads which the connection lines correspond to, and two ends of the transverse lines are respectively connected to the connection lines and the sub-leads which the connection lines correspond to; the common electrode is disposed along the fan-shaped leads and the transverse line and is strip-shaped.

Further, the transverse line is disposed along the first direction.

Further, a length of the connection line belong to the diversion line is greater than a length of other connection line; a length of the diversion line is greater than 400 μm.

Further, the common electrode further includes a plurality of gate strip sections between the lateral section and the effective display region and perpendicularly connected to the lateral section.

Further, the connection lines and the gate strip sections between the lateral section and the effective display region are all the diversion lines.

Further, a V-shaped region is formed between the two sets of the fan-shaped leads, and the common electrode is disposed along an edge of the fan-shaped leads and is V-shaped; each end of the connection lines away from the effective display region is directly connected to the corresponding sub-lead.

Further, each set of the fan-shaped leads includes a plurality of sub-leads which are spaced apart and intersect to the first direction and the second direction; a distance between the adjacent sets of the fan-shaped leads gradually increases from a side close to the effective display region to a side away from the effective display region; the plurality of the connection lines are juxtaposably disposed and spaced apart along the first direction and correspondingly disposed to one of the sub-leads in the fan-shaped leads respectively; all of the common electrodes are formed from two metal layers, and the two metal layers are a gate electrode metal layer and a source drain electrode metal layer respectively.

The present disclosure further provides a display panel which includes the array substrate mentioned above.

The array substrate provided by the present disclosure includes an effective display region and a peripheral lead region; at least two sets of fan-shaped leads are formed on the peripheral lead region and juxtaposably disposed and spaced apart along a first direction, a common electrode is between the adjacent two sets of the fan-shaped leads, and a plurality of connection lines extend from an edge of the effective display region; the common electrode includes a lateral section; a distance between the lateral section and the effective display region is greater than 500 μm; the connection line and the common electrode constitute into a plurality of diversion lines extending along the second direction on a section between the lateral section and the effective display region. Through changing the route design of the peripheral lead region, the present disclosure make PI liquid can be successfully diffused and homogenize the PI film thickness at this location to avoid the surrounding mura phenomenon caused by uneven diffusion of the PI liquid, so that improves quality of the display panel. The display panel of the present disclosure includes the array substrate mentioned above, can avoid the peripheral mura phenomenon caused by the uneven diffusion of the PI liquid, so that improves quality of the display panel.

In order to further understand the features and technical contents of the present disclosure, please refer to the following detailed description and accompanying figures regarding to the present disclosure. The accompanying figures are provided for reference and description only and are not intended to limit the present disclosure.

BRIEF DESCRIPTION OF THE SEVERAL VIEWS OF THE DRAWINGS

The technical solutions and other advantageous effects of the present invention will be apparent with reference to the following accompanying drawings and detailed description of embodiments of the present disclosure.

DESCRIPTION OF SPECIFIC EMBODIMENTS OF THE INVENTION

In order to further clarify the technical means and effects of the present disclosure, the following will be made in combined with the preferred embodiments of the present disclosure and the accompanying drawings for describing in detail.

Figure 1:
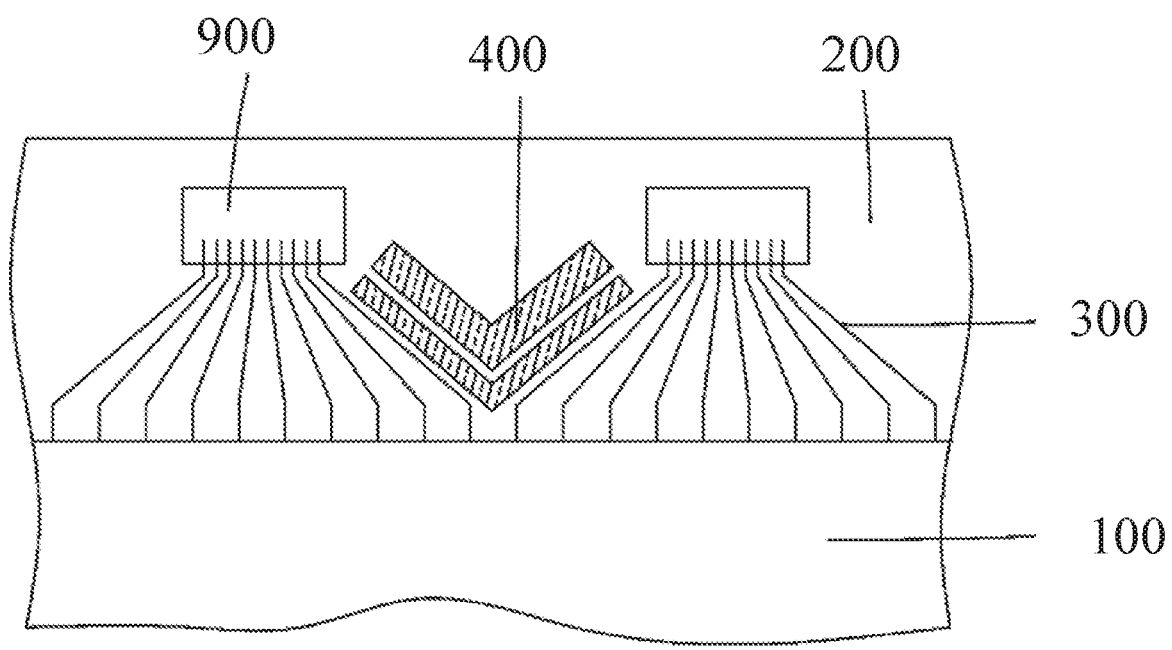
FIG. 1 is a plane schematic diagram of a current array substrate in the area where the peripheral uneven display phenomenon (mura) is prone to occur.
Figure 2:
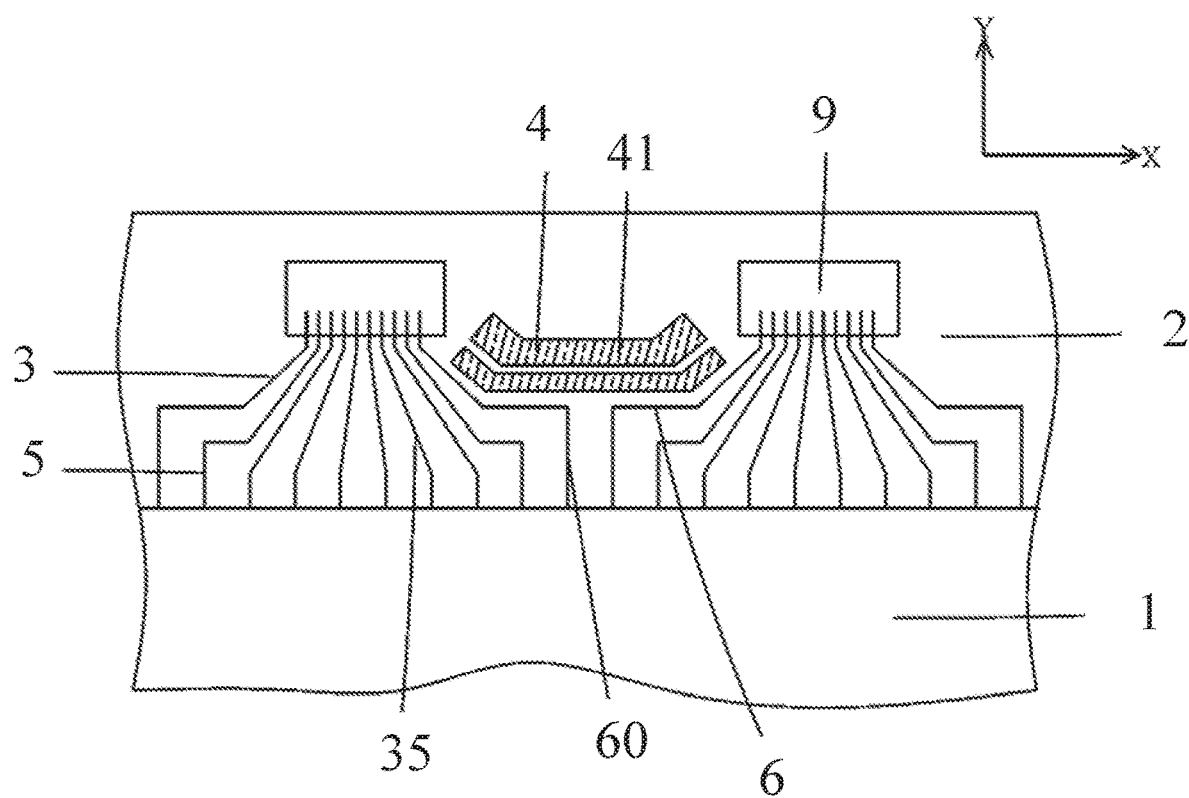
FIG. 2 is a plane schematic diagram of partial area in the first embodiment of the array substrate of the present disclosure.

Please refer to FIG. 2, the first embodiment of the present disclosure includes an effective display region 1 and a peripheral lead region 2 located on a side of the effective display region 1.

At least two sets of fan-shaped leads 3 is formed on the peripheral lead region 2 and is juxtaposably disposed and spaced apart along a first direction X, a common electrode 4 is between the adjacent two sets of the fan-shaped leads 3, and a plurality of connection lines 5 extend from an edge of the effective display region 1 to a second direction Y perpendicular to the first direction X. Each set of the fan-shaped leads 3 is corresponded to connect to a chip on film (COF) 9, the COF 9 transmits a display signal to the effective display region 1 by the fan-shaped leads 3 and the connection lines 5.

Specifically, each set of the fan-shaped leads 3 includes a plurality of sub-leads 35 which are spaced apart and intersect to the first direction X and the second direction Y; a distance between the adjacent sets of the fan-shaped leads 3 gradually increases from a side close to the effective display region 1 to a side away from the effective display region 1.

Specifically, the plurality of the connection lines 5 are juxtaposably disposed and spaced apart along the first direction X and are correspondingly disposed to one of the sub-leads 35 in the fan-shaped leads 3 respectively.

Specifically, the common electrode 4 includes a lateral section 41 extending along the first direction X, and a distance between the lateral section 41 and the effective display region 1 is greater than 500 μm, and the connection lines 5 and the common electrode 4 constitute into a plurality of diversion lines 60 extending along the second direction Y on a section between the lateral section 41 and the effective display region 1. Thereby relative to prior art, the lateral section 41 which can block the PI liquid to diffuse, can be adjusted outward relative to the effective display area 1 through making the common electrode 4 extend along the first direction X by the present disclosure. Thereby making the PI liquid can be successfully diffused and homogenize the PI film thickness at this location to avoid the surrounding mura phenomenon caused by uneven diffusion of the PI liquid, so that improves quality of the display panel.

Preferably, a distance between the lateral section 41 and the effective display region 1 is greater than 1000 μm.

Specifically, the closet section between the common electrode 4 and the effective display region 1 is belong to the lateral section 41, therefore, the diversion lines 60 are only the connection lines 5 between the lateral section 41 and the effective display region 1.

Specifically, a distance between the two closet sub-leads 35 respectively located in the adjacent two sets of the fan-shaped leads 3 on an end of the effective display region 1 is greater than a distance between the two connection lines 5 which the two sub-leads 35 corresponding to.

Specifically, the transverse lines 6 are disposed between the connection lines 5 and the sub-leads 35 which the connection lines 5 correspond to, and two ends of the transverse lines 6 are respectively connected to the connection lines 5 and the sub-leads 35 which the connection lines 5 corresponds to; the common electrode 4 is disposed along the fan-shaped leads 3 and the transverse lines 6, and the common electrode 4 is strip-shaped in whole.

Further, the transverse lines 6 are disposed along the first direction X.

Specifically, a length of the connection lines 5 belong to the diversion lines 60 is greater than a length of other connection lines 5, and a length of the diversion lines 60 is greater than 400 μm, preferably greater than 800 μm.

Specifically, all of the common electrodes 4 are formed from a same metal layer, the metal layer is a gate electrode metal layer or a source drain electrode metal layer; all of the common electrodes 4 may also be formed from two metal layers, and the two metal layers are a gate electrode metal layer and a source drain electrode metal layer respectively.

Specifically, the COF 9 can be used as a COF for transmitting a data signal, and can also be used as a COF for transmitting a gate electrode driving signal.

Specifically, the connection lines 5 are used for connecting data lines in the effective display region 1 or for connecting gate lines in effective display region 1.

The first embodiment of the array substrate of the present disclosure relative to prior art, through adjusting the common electrode 4 outward relative to the effective display area 1 and extending the connection lines 5 between the common electrode 4 and the effective display region 1 to make the connection lines 5 into the diversion lines 60 with drainage effect. Thereby making the PI liquid successfully can be diffused and homogenize the PI film thickness at the location where the two fan-shaped leads 3 intersect, thereby avoiding the surrounding mura phenomenon caused by uneven diffusion of the PI liquid, so that improves quality of the display panel.

Figure 3:
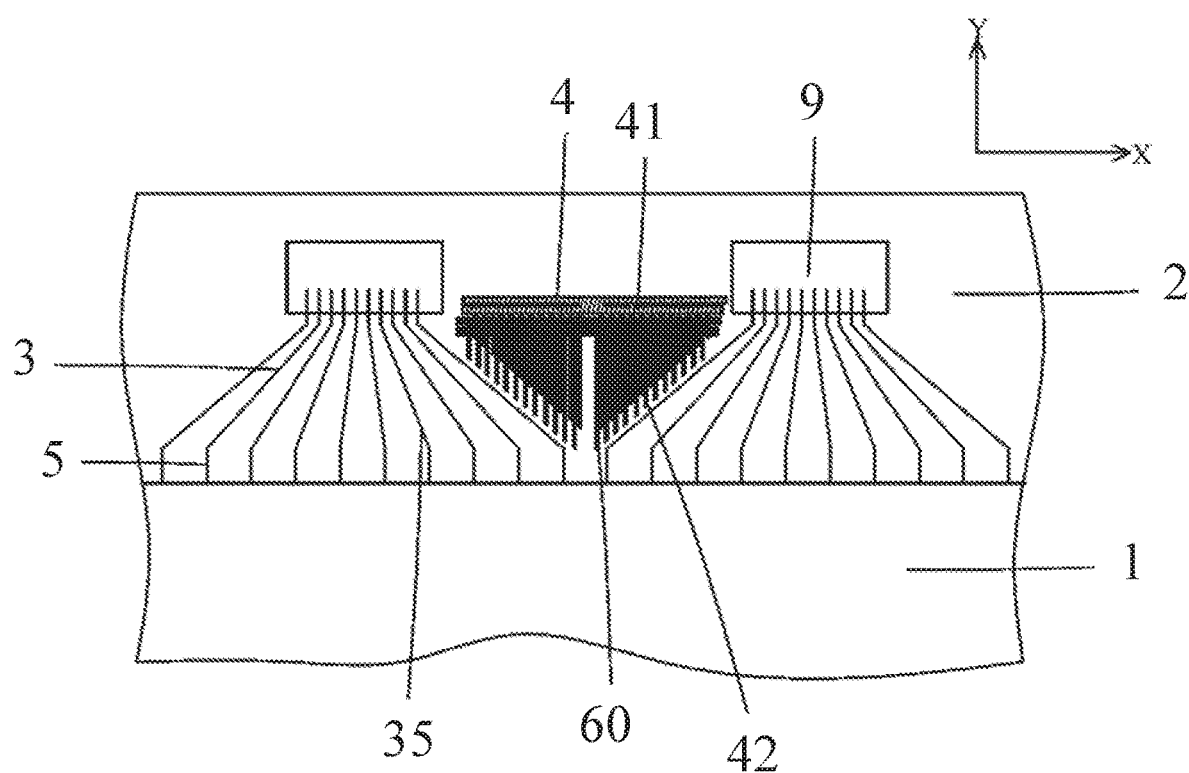
FIG. 3 is a plane schematic diagram of partial area in the second embodiment of the array substrate of the present disclosure.

Please refer to FIG. 3, the difference between the second embodiment and the of the first embodiment of the present disclosure is that the common electrode 4 is fence-shaped, and the common electrode 4 further includes a plurality of gate strip sections 42 between the lateral section 41 and the effective display region 1 and perpendicularly connected to the lateral section 41. Therefore, the connection lines 5 and the gate strip sections 42 between the lateral section 41 and the effective display region 1 are all the diversion lines 60. A V-shaped region 35 is formed between the two sets of the fan-shaped leads 3, and the common electrode 4 is disposed along an edge of the fan-shaped leads 3, and the common electrode 4 is V-shaped in whole, and each end of the connection lines 5 away from the effective display region 1 is directly connected to the corresponding sub-lead 35; two common electrodes 4 are disposed between the two adjacent fan-shaped leads 3, and the two common electrodes 4 are respectively formed by two metal layers that are different layers, and the two metal layers are a gate electrode metal layer and a source drain electrode metal layer respectively.

The second embodiment of the array substrate of the present disclosure relative to prior art, through making the common electrode 4 in fence-shaped to form a plurality of the gate strip sections 42 having a drainage effect on the common electrode 4, thereby making the PI liquid successfully diffuse and homogenize the PI film thickness at the location where the two fan-shaped leads 3 intersect to avoid the surrounding mura phenomenon caused by uneven diffusion of the PI liquid, so that improves quality of the display panel.

The display panel of the present disclosure applies the array substrate mentioned above, through making the common electrode 4 along the first direction X, the present disclosure can adjust the lateral section 41 which can block the diffusion of the PI liquid outward relative to the effective display area 1. Thereby making the PI liquid successfully diffuse at this location and homogenize the PI film thickness and avoiding the surrounding mura phenomenon caused by uneven diffusion of the PI liquid to improve quality of the display panel.

In summary, the array substrate provided by the present disclosure includes the effective display region and the peripheral lead region; at least two sets of the fan-shaped leads are formed on the peripheral lead region and are juxtaposably disposed and spaced apart along the first direction, the common electrode is between the adjacent two sets of the fan-shaped leads, and the plurality of the connection lines extend from an edge of the effective display region; the common electrode includes a lateral section; a distance between the lateral section and the effective display region is greater than 500 μm; the connection lines and the common electrode constitute into the plurality of the diversion lines extending along the second direction on a section between the lateral section and the effective display region. Through changing the route design of the peripheral lead region, the present disclosure makes PI liquid can be successfully diffused and homogenize the PI film thickness at this location, thereby avoiding the surrounding mura phenomenon caused by uneven diffusion of the PI liquid, so that improves quality of the display panel. The display panel of the present disclosure includes the array substrate mentioned above, can avoid the peripheral mura phenomenon caused by the uneven diffusion of the PI liquid, so that improves quality of the display panel.

In the above, for those of ordinary skill in the art, various other corresponding changes and modifications can be made according to the technical solutions and technical ideas of the present disclosure, and all such changes and modifications are intended to fall within the scope of protection of the claims of the present disclosure.

What is claimed is:

1. An array substrate, comprising an effective display region and a peripheral lead region located on a side of the effective display region;
    at least two sets of fan-shaped leads formed on the peripheral lead region and juxtaposably disposed and spaced apart along a first direction, a common electrode between the adjacent two sets of the fan-shaped leads, and a plurality of connection lines extending from an edge of the effective display region to a second direction perpendicular to the first direction;
    the common electrode comprising a lateral section extending along the first direction;
    the connection lines and the common electrode constituting into a plurality of diversion lines extending along the second direction on a section between the lateral section and the effective display region; and
    a distance between the lateral section and the effective display region greater than 500 μm.

2. The array substrate as claimed in claim 1, wherein the lateral section is a section of the common electrode that is closest to the effective display region;
    the diversion lines are the connection lines between the lateral section and the effective display region.

3. The array substrate as claimed in claim 2, wherein a distance between two closet sub-leads respectively located in the adjacent two sets of the fan-shaped leads on an end of the effective display region is greater than a distance between the two connection lines which the two sub-leads correspond to.

4. The array substrate as claimed in claim 3, wherein the transverse lines are disposed between the connection lines and the sub-leads which the connection lines correspond to, and two ends of the transverse lines are respectively connected to the connection lines and the sub-leads which the connection lines correspond to;
the common electrode is disposed along the fan-shaped leads and the transverse lines, and the common electrode is strip-shaped.

5. The array substrate as claimed in claim 4, wherein the transverse lines are disposed along the first direction.

6. The array substrate as claimed in claim 2, wherein a length of the connection line belong to the diversion line is greater than a length of other connection lines;
a length of the diversion line is longer than 400 μm.

7. The array substrate as claimed in claim 1, wherein the common electrode further comprises a plurality of gate strip sections between the lateral section and the effective display region and perpendicularly connected to the lateral section;
the connection lines and the gate strip sections between the lateral section and the effective display region are all the diversion lines.

8. The array substrate as claimed in claim 7, wherein a V-shaped region is formed between the two sets of the fan-shaped leads, and the common electrode is disposed along an edge of the fan-shaped leads, and the common electrode is V-shaped;
each end of the connection lines away from the effective display region is directly connected to the corresponding sub-lead.

9. The array substrate as claimed in claim 1, wherein each set of the fan-shaped leads comprises a plurality of sub-leads which are spaced apart and intersect to the first direction and the second direction; a distance between the adjacent sets of the fan-shaped leads gradually increases from a side close to the effective display region to a side away from the effective display region;
the plurality of the connection lines are juxtaposably disposed and spaced apart along the first direction and correspondingly disposed to one of the sub-leads in the fan-shaped leads respectively;
all of the common electrodes are formed from two metal layers, and the two metal layers are a gate electrode metal layer and a source drain electrode metal layer respectively.

10. A display panel, comprising an array substrate;
the array substrate comprising an effective display region and a peripheral lead region located on a side of the effective display region;
at least two sets of fan-shaped leads formed on the peripheral lead region and juxtaposably disposed and spaced apart along a first direction, a common electrode between the adjacent two sets of the fan-shaped leads, and a plurality of connection lines extending from an edge of the effective display region to a second direction perpendicular to the first direction;
the common electrode comprising a lateral section extending along the first direction;
the connection lines and the common electrode constituting into the connection lines and the common electrode constituting into a plurality of diversion lines extending along the second direction on a section between the lateral section and the effective display region; and
a distance between the lateral section and the effective display region greater than 500 μm.

11. The display panel as claimed in claim 10, wherein the lateral section is a section of the common electrode closest to the effective display region;
the diversion lines are the connection lines between the lateral section and the effective display region.

12. The display panel as claimed in claim 11, wherein a distance between two closet sub-leads respectively located in the adjacent two sets of the fan-shaped leads on an end of the effective display region is greater than a distance between the two connection lines which the two sub-leads corresponding to.

13. The display panel as claimed in claim 12, wherein the transverse lines are disposed between the connection lines and the sub-leads which the connection lines correspond to, and two ends of the transverse lines are respectively connected to the connection lines and the sub-leads which the connection lines correspond to;
the common electrode is disposed along the fan-shaped leads and the transverse lines, and the common electrode is strip-shaped.

14. The display panel as claimed in claim 13, wherein the transverse lines are along the first direction.

15. The display panel as claimed in claim 11, wherein a length of the connection lines belong to the diversion lines is greater than a length of other connection lines;
a length of the diversion lines is greater than 400 μm.

16. The display panel as claimed in claim 10, wherein the common electrode further comprises a plurality of gate strip sections between the lateral section and the effective display region and perpendicularly connected to the lateral section;
the connection lines and the gate strip sections between the lateral section and the effective display region are all the diversion lines.

17. The display panel as claimed in claim 16, wherein a V-shaped region is formed between the two sets of the fan-shaped leads, and the common electrode is disposed along an edge of the fan-shaped leads, and the common electrode and is V-shaped;
each end of the connection lines away from the effective display region is directly connected to the corresponding sub-lead.

18. The display panel as claimed in claim 10, wherein each set of the fan-shaped leads comprises a plurality of sub-leads which are spaced apart and intersect to the first direction and the second direction; a distance between the adjacent sets of the fan-shaped leads gradually increases from a side close to the effective display region to a side away from the effective display region;
the plurality of the connection lines are juxtaposably disposed and spaced apart along the first direction and correspondingly disposed to one of the sub-leads in the fan-shaped leads respectively;
all of the common electrodes are formed from two metal layers, and the two metal layers are a gate electrode metal layer and a source drain electrode metal layer respectively.

\* \* \* \* \*

UNITED STATES PATENT AND TRADEMARK OFFICE
CERTIFICATE OF CORRECTION

Page 1 of 1

PATENT NO. : 10,921,658 B2
APPLICATION NO. : 16/603592
DATED : February 16, 2021
INVENTOR(S) : Xing Ouyang et al.

It is certified that error appears in the above-identified patent and that said Letters Patent is hereby corrected as shown below:

On the Title Page

Insert the following:
--(30) *Foreign Application Priority Data*
Apr. 30, 2019 (CN)..........................201910364476.6--

Signed and Sealed this
Eleventh Day of May, 2021

Drew Hirshfeld
*Performing the Functions and Duties of the
Under Secretary of Commerce for Intellectual Property and
Director of the United States Patent and Trademark Office*